Patented July 21, 1931

1,815,599

UNITED STATES PATENT OFFICE

LOUIS L. TUORTO, OF PEQUANAC, NEW JERSEY

COMPOUND FOR CLEANING AND POLISHING SURFACES

No Drawing.  Application filed February 14, 1929.  Serial No. 340,025.

This invention relates to a composition of matter devised for application to window panels, lenses, mirrors and polished, tarnishable metals of various kinds and classes; and the object of the invention is to provide a compound or composition of matter of the class specified, the use or application of which in the manner hereinafter set forth will operate to preserve and maintain a clean and polished surface on articles or devices of the class mentioned for a comparatively long period of time, and which will prevent spotting or otherwise, marring of such surfaces; and with these and other objects, in view, the invention consists in a compound of the class and for the purpose specified which is compounded merchandised and used in the manner hereinafter more fully set forth.

In producing the preferred form of my improved compound, in producing a pound or fraction thereof or many pounds, I use substantially and approximately the following proportionate parts of the several ingredients named:

Ten (10) parts of leaf lard (pure).

Four (4) parts of a wax substance, preferably paraffin.

One (1) part of a highly volatile substance, for example, alcohol or naptha.

One (1) part of glycerine.

In compounding the ingredients above specified, the proportionate amounts of lard and wax, preferably paraffin, are melted by subjecting the same to heat, preferably using a double boiler or kettle, wherein a water insulation is provided between the flame to prevent scorching. When the lard and wax have become melted and thoroughly mixed, the glycerine, if employed, is introduced and thoroughly agitated into the mass after which the resulting product is removed from the flame and allowed to cool to a slight extent. While in liquid state, the alcohol or naptha is introduced and the product thus assembled thoroughly agitated, after which the same is placed in one or more containers and allowed to cool and harden to form in the containers a heavy, salve-like substance. It is preferred that the product be placed in comparatively small tins, such as used in the sale of shoe polish and similar substances, for wholesale and retail distribution.

The resulting product may be readily removed from the tin after removing the usual cover, by drawing a rag over the salve-like substance which is comparatively hard, but which will free a portion of the compound in this operation, to facilitate its application to the surface to be cleaned and polished.

In the use of the compound, the window glass, lens, mirror or metal surface is entirely coated or covered with the compound by a very thin film thereof, after which a damp cloth is rubbed vigorously over the surface, care being taken to pass over the entire surface to be cleaned in this operation. When it appears that the compound has been removed or the whiteness of the compound disappeared, a dry rag is also rubbed over the surface to complete the final cleaning and polishing operation.

While no substance apparently appears to remain on the clean surface, there is nevertheless a thin, transparent and translucent film or coating remaining on this surface, which renders the same substantially waterproof, and being further protected from the elements to prevent spotting or tarnishing of the surface so treated, for a comparatively long period of time. Should any dust or the like collect on the surface, the same may be removed with a dry rag or if necessary with a damp rag, and the clean, clear and polished surface will remain.

At this time, it is well to mention that while I prefer to use a highly volatile substance such for example as alcohol or naptha, to facilitate the cleaning activities or characteristics thereof, it is nevertheless not absolutely necessary to use this ingredient, and this also applies to the use of glycerine, which is introduced into the compound to increase the salve-like characteristics of the product.

I have found in practice that the proportionate amounts of lard and wax or paraffin, will produce satisfactory results. It will therefore be understood that my invention is not necessarily limited to the use of all of the ingredients herein specified. It will also be apparent that the substitution of elements of like properties or characteristics to those mentioned in the compound, may also be employed without departing from the spirit of my invention.

My improved compound has an extensive, practical use upon plate glass windows of various kinds and classes and especially those employed on the windshields of motor vehicles or on other parts of motor vehicles, trains, cars and other public conveyances as well as on eye glass lenses or lenses employed in apparatus of any kind or class, the use of my improved compound serving to maintain the exposed surfaces of the glass or lenses in a clean, spotless state for many weeks without requiring further application of the compound.

This also applies to the protection of polished metal surfaces of various kinds and classes, such as nickel, silver, brass and the many other known polished metals. It will also be understood that my improved compound may be used upon painted or varnished surfaces, particularly such surfaces on motor vehicles, to maintain the same in a clean and spotless state.

Having fully described my invention, what I claim as new and desire to secure by Letters Patent, is:—

1. The herein described compound consisting of approximately ten parts of lard, four parts of wax, one part of naphtha and one part of glycerine.

2. A compound for cleaning and polishing glass, metal and other surfaces consisting of leaf lard, paraffin, naphtha and glycerine combined in substantially the proportions set forth.

In testimony that I claim the foregoing as my invention I have signed my name this 11th day of February, 1929.

LOUIS L. TUORTO.